March 26, 1968  A. B. SHATTUCK  3,374,666
VOLUMETRIC EFFICIENCY COMPUTER
Filed April 21, 1966
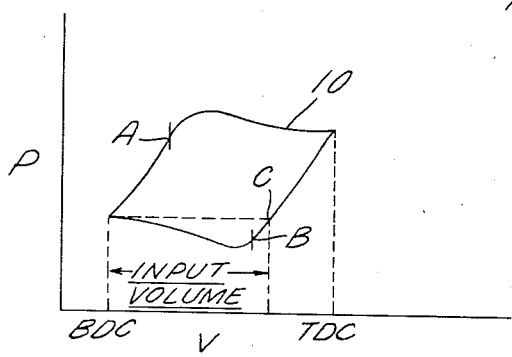
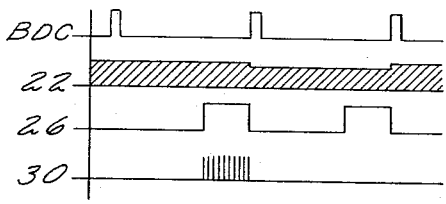
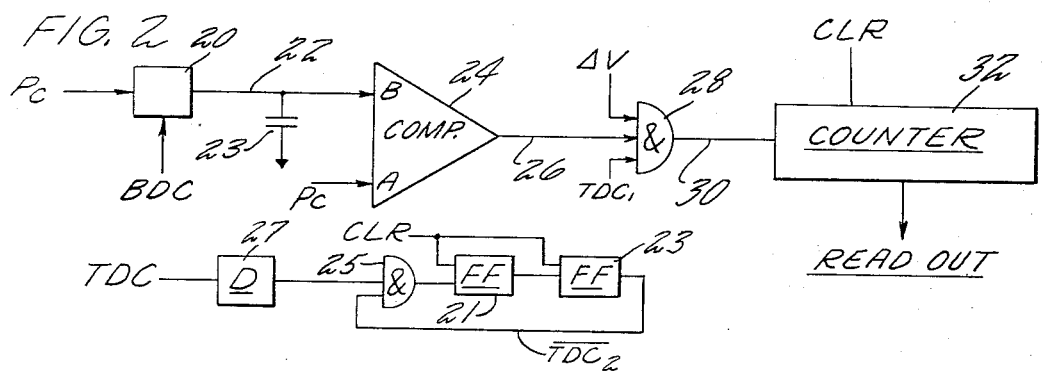
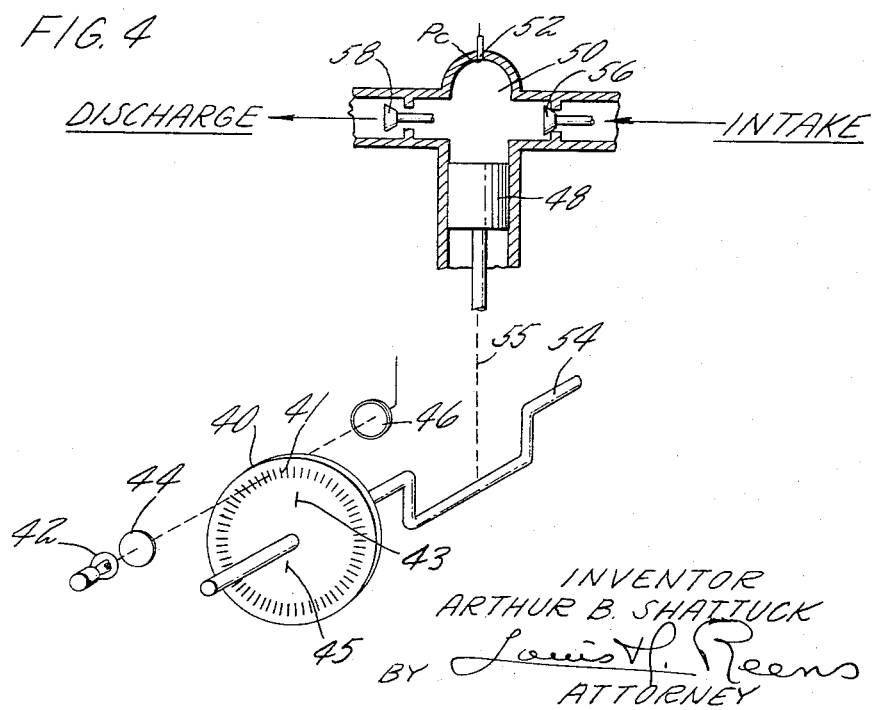
INVENTOR
ARTHUR B. SHATTUCK
BY Louis H. Reens
ATTORNEY

United States Patent Office

3,374,666
Patented Mar. 26, 1968

3,374,666
VOLUMETRIC EFFICIENCY COMPUTER
Arthur B. Shattuck, East Hartford, Conn., assignor to United Aircraft Corporation, East Hartford, Conn., a corporation of Delaware
Filed Apr. 21, 1966, Ser. No. 544,253
9 Claims. (Cl. 73—115)

This invention relates to a device for computing the volumetric efficiency of an engine.

Volumetric efficiency is defined as the ratio of the volume of a gas entering a cylinder to the swept piston displacement of the cylinder. In the past the volumetric efficiency of a cylinder was computed by a graphical construction from a pressure-volume curve. The prior art graphical method involves the use of a planimeter to integrate areas under a curve and is manually performed. The time involved using the planimeter is time consuming and is subject to inaccuracies.

It is therefore an object of this invention to provide a device for automatically indicating the volumetric efficiency of a cylinder having a piston.

It is a further object of this invention to quickly compute the volumetric efficiency of a cylinder by the use of digital circuitry.

It is still another object of this invention to automatically compute the discharge volumetric efficency of a cylinder having a piston.

These objects and others will become readily apparent upon a review of the drawings and the description thereof as follows:

In the drawings FIGURE 1 shows a pressure vs. volume curve of a cylinder of the type suitable for use by this invention.

FIGURE 2 shows the digital circuitry needed to accomplish the volumetric efficiency computation.

FIGURE 3 shows the relative timing signals involved in the computation of the volumetric efficiency.

FIGURE 4 shows a cylinder and piston arrangement with swept volume and pressure transducer.

In a copending application filed by Messrs. Lovkay and Ives dated May 13, 1965, entitled Engine Performance Indicator, and assigned to the same assignee, an engine analyzer is disclosed. In that copending application a transducer is described for obtaining digital signals indicative of the equal volume increments swept out by the piston in a cylinder. Such a disk 40 is shown in FIGURE 4. A light 42 is directed by means of a lense 44 at the disk 40 which as it rotates passes the light through slits 41 onto the photocell 46. By appropriately locating the slits 41 on the disk 40 the light pulses obtained from the photocell 46 can be made to correspond to the equal volume increments displaced as the piston 48 sweeps through the cylinder 50. Inside the chamber 50 is a pressure transducer 52 producing an electrical signal which accurately reflects the pressure within the cylinder as the piston is moved up and down by the rod 54 through the linkage 55. The intake valve 56 and the discharge valve 58 provide the intake and discharge functions necessary to obtain the desired pressurization of the fluid to be pumped.

Similarly the disk 40 may be provided with slits 43 and 45 each one indicative of the occurrence respectively of the bottom dead center and top dead center of the piston 48 within the cylinder 50 and provide electrical signals indicative thereof.

FIGURE 1 shows a typical pressure vs. volume curve for a large gas compressor shown in FIGURE 4. The curve may be explained as follows. Starting at the bottom dead center position the piston 48 increases the pressure within the cylinder to such a point that the discharge valve opens at point A. As the piston 48 continues toward the TDC position the pressure in the cylinder will increase slightly but thereafter it decreases to that of the exhaust port as the piston reaches TDC. At the top dead center position the piston again commences downwardly and its swept volume increases with a corresponding decrease in the pressure in the chamber until the pressure at the intake port exceeds that within the chamber at point B. At this point B the intake valve opens and allows gas from the feed line to come into the cylinder until the pressure within the cylinder 50 reaches that of the intake port which occurs approximately at the bottom dead center position of the piston.

It thus may be seen that the volumetric efficiency of a pressure-volume curve such as shown in FIGURE 1 may be obtained by monitoring the pressure at the BDC point and comparing this value with the pressures in the cylinder as the piston descends from the TDC position. A signal may be derived which would indicate when the pressure in the vicinity of point B is equal to or commences to be less than the pressure at the BDC point. Calling this equal pressure point C one may be able to compute the volumetric efficiency by noting the volume to be swept out by the piston 48 between point C and the BDC position. Thereupon a ratio of this swept volume to the known total swept volume as indicated from BDC to TDC may be simply computed to provide the volumetric efficiency.

Similarly one may compute discharge volumetric efficiency. In that case the pressure at the TDC position is compared with the cylinder pressure and noting the volume swept out by the piston when the latter pressure is higher than the discharge pressure.

Since the disk 40 in FIGURE 4 together with associated lights and circuitry provides equal volume increments as the piston 48 reciprocates through the cylinder 50 the circuitry for providing the computation is shown in FIGURE 2. In FIGURE 2 the pressure signal $P_c$ is connected to a sample and hold circuit comprising the sampling circuit 20 and the holding storage capacitor 23. The circuit is activated by a pulse corresponding to the BDC position of the piston 48. The occurrence of the BDC pulse will store an electrical analog signal indicative of the pressure in the cylinder in the capacitor 23. The stored value of the pressure signal is thereupon continually compared to the pressure signal as the piston 48 moves from bottom dead center to top dead center and back to the bottom dead center position. This comparison is done with comparison amplifier 24 which produces an output pulse when the pressure signal at input A is less than the stored pressure signal applied to input B. The output of comparator 24 is then applied to an AND gate 28 together with the equal volume increment pulses $\Delta V$. When the input A drops below the input B of comparator amplifier 24 the AND gate 28 is enabled and allows the $\Delta V$ pulses to pass via line 30 to counter 32.

The counter 32 is appropriately scaled with regard to the total amount of equal volume pulses occurring from BDC to TDC so that the volumetric efficiency may be directly read out. For instance the total amount of equal volume pulses between bottom dead center and top dead center are adjusted to equal 100 pulses so that the binary coded decimal counter 32 may provide with standard decimal readout devices an accurate indication of the volumetric efficiency without further scaling adjustments. Since a single measurement is needed the computation is performed once by inhibiting the computation. This may simply be done by external control circuitry as shown in FIGURE 2.

The counter consisting of flip flops 21 and 23 is controlled by TDC pulses applied to AND gate 25 through delay 27. Two counts are decoded namely TDC$_1$ and TDC$_2$. TDC$_1$ is the first TDC pulse after the counter has been cleared and while it occurs it enables the AND gate 28 for just one full revolution of the piston.

Upon the decoding of TDC$_2$ the counter shuts itself off by applying the inverse of TDC$_2$ to disable AND gate 25. Unless a new clear pulse occurs the volumetric efficiency computer is inhibited. The start pulse is generated upon the release of a push button (not shown) and clears the counter 32 as well as the flip flops 21 and 23.

For discharge volumetric efficiency computations the BDC pulses are applied to AND gate 25 and the BDC$_1$ and BDC$_2$ pulses are decoded from the counter.

FIGURE 3 shows the timing involved with this invention. The bottom dead center pulse occurs as indicated. The stored value of the pressure signal is indicated at line 22 and varies a small amount as new samples are taken with each BDC pulse. The output of comparison amplifier 24 is shown along line 26 and the output from the AND gate 28 is indicated as a series of pulses on line 30.

Although the pressure signals are compared in their analog state it is of course feasible and within the art to make the comparison in digital format after the pressure signal has been converted by a digital to analog converter. The digital information can be stored in a register and a digital comparison can be performed after the pressure signal has been converted to digital format.

Although the volumetric efficiency computation as herein described is based upon the measurement of the swept volume comparison between point C and the bottom dead center of the piston 48 it should be realized that with double acting pistons the top dead center as well as the bottom dead center may be utilized to compute volumetric efficiency on each side of the piston. Hence, whenever the cylinder pressure approaches that of the intake and discharge ports at the extreme positions of the piston the TDC and BDC pulses may be used to initiate the timing. It should be realized that the volumetric efficiency computation described herein is known as the suction volumetric efficiency and that the discharge volumetric efficiency can be computed.

For cylinders where the pressure does not reach that of the intake at the bottom dead center position the stored pressure signal is replaced with the intake pressure signal by providing the appropriate pressure sensor at the intake. In this case the intake pressure is contiuously compared with the cylinder pressure and there is no need for storage of pressure signals. Similarly, one may compute the discharge volumetric efficiency when the cylinder pressure does not equal the discharge pressure at the TDC piston position.

It is to be understood that the invention is not limited to the specific embodiment herein illustrated and described but may be used in other ways without departure from its spirit as defined by the following claims.

I claim:

1. A device for computing the volmetric efficiency of a cylinder having a piston comprising:
   means for generating a signal indicative of the botton dead center position of the piston in the cylinder,
   means for generating a signal indicative of equal volume increments swept out by the piston within the cylinder,
   means for generating a signal indicative of the pressure within the cylinder,
   means for storing the pressure signal of the cylinder corresponding to the pressure of the cylinder when the piston is at the bottom dead center position,
   means for comparing said stored pressure signal with said pressure signal and producing a signal indicative when said pressure signal is less than said stored pressure signal, and
   means activated by said comparison signal for counting said equal volume increments.

2. A device for computing the volumetric efficiency of a cylinder saving a piston comprising:
   means for generating a signal indicative of the pressure within the cylinder,
   means for generating a signal indicative of the intake pressure to the cylinder,
   means comparing said intake pressure signal with said cylinder pressure signal and producing a comparison signal indicating when said cylinder pressure is less than said intake pressure,
   means for generating a signal indicative of the volume swept out by the piston, and
   means activated by said comparison signal and responsive to said swept volume signal for producing a signal indicative of the volume swept out by the piston during the time said cylinder pressure is lower than said intake pressure.

3. A device as recited in claim 2 wherein said intake pressure signal generating means comprises:
   means for generating a signal indicative of an extreme position of the piston in the cylinder,
   means activated by said extreme position signal for storing the cylinder pressure signal, and
   where the cylinder pressure is compared with said stored cylinder pressure signal.

4. A device as recited in claim 3 wherein the means for generating the swept volume signal comprises:
   means for generating a signal indicative of the equal volume increments swept out by the piston, and
   where said volumetric efficiency signal producing means further comprises:
      means actuated by said comparison signal for counting the equal volume increments occurring when the cylinder pressure is less than said intake pressure.

5. A device as recited in claim 4 where said extreme position is the bottom dead center position of the piston.

6. A device for computing the discharge volumetric efficiency of a cylinder having a piston comprising:
   means for generating a signal indicative of the pressure within the cylinder,
   means for generating a signal indicative of the discharge pressure to the cylinder,
   means comparing said discharge pressure signal with said cylinder pressure signal and producing a comparison signal indicating when said discharge pressure is less than said intake pressure,
   means for generating a signal indicative of the volume swept out by the piston, and
   means activated by said comparison signal and responsive to said swept volume signal for producing a signal indicative of the volume swept out by the piston during the time said cylinder pressure is higher than the discharge pressure.

7. A device as recited in claim 6 wherein said discharge pressure signal generating means comprises:
   means for generating a signal indicative of an extreme position of the piston in the cylinder,
   means activated by said extreme position signal for storing the cylinder pressure signal occurring at said extreme piston positions, and
   where the cylinder pressure is compared with said stored cylinder pressure signal.

8. A device as recited in claim 7 wherein the means for generating the swept volume signal comprises:
   means for generating a signal indicative of the equal volume increments swept out by the piston, and
   where said discharge volumetric efficiency signal producing means further comprises:
      means actuated by said comparison signal for counting the equal volume increments occurring when said discharge pressure is less than said cylinder pressure.

9. A device as recited in claim 8 where said extreme position is the top dead center position of the piston.

References Cited

UNITED STATES PATENTS

| 2,349,560 | 5/1944 | Reijnst | 73—115 |
| 2,919,576 | 1/1960 | Weller et al. | 73—115 |
| 2,924,712 | 2/1960 | Edens | 73—116 |
| 3,283,569 | 11/1966 | King et al. | 73—115 |
| 3,350,928 | 11/1967 | Fedde | 73—116 |

RICHARD C. QUEISSER, *Primary Examiner.*

J. W. MYRACLE, *Assistant Examiner.*